US005897254A

United States Patent [19]

Tanaka et al.

[11] Patent Number: 5,897,254

[45] Date of Patent: Apr. 27, 1999

[54] MELT-TYPE THERMAL TRANSFER PRINTING APPARATUS AND A PRINTING SHEET WITH MULTIPLE POROUS LAYERS

[75] Inventors: Hideshi Tanaka, Yokohama; Yuji Kikuchi, Mito, both of Japan

[73] Assignee: Victor Company of Japan, Ltd., Yokohama, Japan

[21] Appl. No.: 08/893,763

[22] Filed: Jul. 11, 1997

[30] Foreign Application Priority Data

Jul. 12, 1996 [JP] Japan .................................... 8-201028
Mar. 18, 1997 [JP] Japan .................................... 9-065209

[51] Int. Cl.$^{6}$ ................................ B41J 2/325; B32B 3/26

[52] U.S. Cl. ................. 400/120.07; 428/212; 428/304.4; 428/913; 428/914

[58] Field of Search .................... 400/120.07; 428/304.4, 428/306.6, 315.9, 316.6, 212, 913, 914

[56] References Cited

U.S. PATENT DOCUMENTS

| | | | |
|---|---|---|---|
| 4,460,637 | 7/1984 | Miyamoto et al. | 428/212 |
| 5,275,867 | 1/1994 | Misuda et al. | 428/195 |
| 5,441,921 | 8/1995 | Verdonck et al. | 503/227 |
| 5,521,626 | 5/1996 | Tanaka et al. | 347/183 |
| 5,529,972 | 6/1996 | Ramello et al. | 503/227 |
| 5,631,076 | 5/1997 | Hakomori et al. | 428/304.4 |
| 5,654,080 | 8/1997 | Hayashi et al. | 428/198 |
| 5,700,755 | 12/1997 | Morrison et al. | 503/227 |

FOREIGN PATENT DOCUMENTS

| | | |
|---|---|---|
| 0 334 607 | 9/1989 | European Pat. Off. . |
| 652114 | 5/1995 | European Pat. Off. . |
| 710571 | 5/1996 | European Pat. Off. . |
| 1-97686 | 4/1989 | Japan . |
| 5-155163 | 6/1993 | Japan . |
| 7-125468 | 5/1995 | Japan . |
| 0610102 | 7/1995 | Japan . |
| 8-34169 | 2/1996 | Japan . |
| 96/19354 | 6/1996 | WIPO . |

OTHER PUBLICATIONS

"High–Quality Color Printing by Heat Fusible Penetrative Method" by H. Tanaka; The 9th International Congress on Advances in Non–Impact Printing Technologies/Japan Hardcopy '93; Oct. 4–8, 1993; pp., 326–329.

"The Wax Melt Thermal Transfer Variable Density Printing Method" by H. Tanaka; Asia Display '95; Oct. 16–18, 1995; pp., 675–678.

*Primary Examiner*—Edgar Burr
*Assistant Examiner*—Daniel J. Colilla
*Attorney, Agent, or Firm*—Lowe Hauptman Gopstein Gilman & Berner

[57] ABSTRACT

In a melt-type thermal transfer printing apparatus, an ink ribbon is brought into contact with a recording medium. A thermal head presses the ink ribbon. By controlling an electric power supplied to the thermal head, a melt or fusion area of ink is controlled so as to obtain a multi-gradational image on the recording medium. The recording medium is a porous surfaced medium having a multilayered porous layer containing numerous pores having a porous diameter in a range up to about 25 μm.

4 Claims, 10 Drawing Sheets

MELT-TYPE THERMAL TRANSFER PRINTING APPARATUS AND A PRINTING SHEET WITH MULTIPLE POROUS LAYERS

BACKGROUND OF THE INVENTION

1. Field of the Invention

The present invention relates to an improvement of a melt-type thermal transfer printing apparatus realizing a multi-gradational printing image using a heat fusible ink and a printing sheet used for this melt-type thermal transfer printing apparatus.

2. Prior Art

Published Japanese Patent Application No. 07125468 A/1995, entitled "Thermal Transfer Recording Sheet and Thermal Transfer Printer Using the Same", proposes a thermal transfer printer and a thermal transfer printing sheet used for this printer.

The technique disclosed in this prior art relates to a recording of a multi- gradational image that is realized by using a porous recording medium which comprises a porous layer having a pore diameter of 1 to 10 μm formed on a base material made of a plastic such as a synthetic paper or a polyester.

However, when the above-described conventional porous recording medium is used as a printing sheet, there is a problem that the touch is different from that of a plain paper or that the price is expensive.

In general, a plain paper made of pulp is not suitable when used for realizing a porous layer because a pore diameter of the resultant porous layer becomes relatively large.

In view of practical aspects, a development is earnestly expected in the field of a printing technology applicable to papers having a porous layer whose pore diameter exceeds 10 μm.

SUMMARY OF THE INVENTION

In view of the foregoing, an object of the present invention is to provide a melt-type thermal transfer printing apparatus capable of obtaining a high-resolution, high-quality, multi-gradational image even if a used porous recording medium has a relatively large pore diameter, and further to provide a printing sheet preferably used for this melt-type thermal transfer printing apparatus.

To accomplish this and other related objects, a first aspect of the present invention provides a melt-type thermal transfer printing apparatus using an ink ribbon brought into contact with a recording medium both of which are pressed by a thermal head under a control of an electric power supplied to the thermal head so that a melt or fusion area of ink can be varied to obtain a multi-gradational image on the recording medium, wherein the recording medium a porous surfaced medium including a plurality of porous layers accumulated on a base material, a pore diameter of each porous layer being in a range less than about 25 μm, the ink ribbon is a ribbon coated with a hot melt or heat fusible ink by a density equal to or less than 2.5 g/m$^2$, and the thermal head is a head having a plurality of heater elements arranged in line, each heater element having a width larger than the pore diameter of the porous layer.

With this arrangement, it becomes possible to realize a high-density multi-gradational printing image by laminating a plurality of porous layers each having a larger pore diameter. That is, by using the accumulated porous layers having a larger pore diameter, the first aspect of the present invention makes it possible to realize a high-density multi-gradational printing image comparable with the conventional image realized by using a porous layer having a smaller pore diameter. This arrangement is advantageous in that a manufacturing cost for a recording medium can be reduced compared with that in the prior art, since a paper having a large pore diameter can be used as the recording medium. Accordingly, the multi-gradational image recording can be easily realized by using heat fusible ink and a printing sheet comprising plain paper as a base material.

Preferably, the melt-type thermal transfer printing apparatus of the above-described first aspect of the present invention further comprises a gradation control circuit that comprises memory means for memorizing image data representing gradation numbers corresponding to images to be printed, comparing means for comparing image data of respective gradation levels generated from the memory means with a gradation number of each gradation, heat time setting means for setting a heat time in accordance with each gradation, and pulse generating means for supplying a pulse signal to the heater element of the thermal head to increase the temperature of the heater element based on an output of the comparing means and an output of the heat time setting means.

By adding the gradation control circuit and controlling a melt or fusion area of ink, an extremely high-resolution, high-quality multi-gradational image can be obtained without using a special thermal head.

Moreover, it is preferable that the melt-type thermal transfer printing apparatus further comprises a pressing means for pressing the thermal head by a predetermined pressure.

Providing the pressing means for pressing the thermal head makes it easy for ink to enter or permeate into each pore of the porous layer. Thus, a stable, high-resolution, high-quality, multi-gradational image can be obtained.

A second aspect of the present invention provides a melt-type thermal transfer printing sheet comprising a base material, and a plurality of porous layers accumulated on this base material, each porous layer having a pore size in a range up to about 25 μm.

By accumulating a plurality of porous layers having a relatively larger pore diameter, the second aspect of the present invention makes it possible to realize a multi-gradational image printing image of high density comparable with the conventional image realized by using a porous layer having a smaller pore diameter. This arrangement is advantageous in that a manufacturing cost for a recording medium can be reduced, since a paper having a large pore diameter can be used as the recording medium. In other words, a plain paper can be used as a base material.

Yet further, a third aspect of the present invention provides a melt-type thermal transfer printing apparatus using an ink ribbon brought into contact with a recording medium both of which are pressed by a thermal head under a control of an electric power supplied to the thermal head so that a melt or fusion area of ink can be varied to realize a multi-gradational image on the recording medium, wherein the recording medium is a porous surfaced medium including a single or multilayered porous layer formed on a base material, the porous layer containing numerous pores at least 80% of which are smaller pores having a pore diameter in a range up to about 10 μm and the remainder being larger pores having diameters in a range of 10 μm to 25 μm, and the ink ribbon is a ribbon coated with a hot melt or heat fusible ink by a density equal to or smaller than 2.5 g/m$^2$.

According to the third aspect of the present invention, the recording medium is the porous surfaced medium including the single or multilayered porous layer formed on the surface of the base material. The porous layer contains numerous porous, at least 80% percentage of which are the smaller pores having a pore diameter within 10 μm and the remainder of which are larger pores having diameters in a range of 10 μm to 25 μm. The ink ribbon is a ribbon coated with a hot melt or heat fusible ink by a density equal to or less than 2.5 g/$m^2$.

By arranging the porous layer into a single or multilayered structure having a larger pore diameter, the third aspect of the present invention makes it possible to realize a multi-gradational printing image of high density comparable with the conventional image realized by using a porous layer having a smaller pore diameter. This arrangement is advantageous in that a manufacturing cost for a recording medium can be reduced compared with that in the prior art, since a paper having a large pore diameter can be used as the recording medium.

Still further, a fourth aspect of the present invention provides a melt-type thermal transfer printing sheet comprising a base material, and a porous layer formed on the base material, the porous layer containing numerous pores, at least 80% percentage of which are smaller pores having a pore diameter in a range up to about 10 μm and the remainder being larger pores having diameters in range of 10 μm to 25 μm.

According to this arrangement, the porous layer formed on the base material contains numerous pores, at least 80% percentage of which are the smaller pores having a pore diameter in a range up to about 10 μm and the remainder being the larger pores having diameters in a range of 10 μm to 25 μm. Thus, it becomes possible to obtain a high-quality multi-gradational printing image. Thus, the productivity can be improved.

Moreover, a fifth aspect of the present invention provides a melt-type thermal transfer printing sheet comprising a base material, and a multilayered porous layer formed on the base material, the porous layer containing numerous pores, at least 80% of which are smaller pores having a pore diameter in a range up to about 10 μm and the remainder being larger pores having a pore diameter in a range of 10 μm to 25 μm.

According to this arrangement, the porous layer having a multilayer structure formed on the surface of the base material contains numerous pores, at least 80% of which are the smaller pores having a pore diameter in a range up to about 10 μm and the remainder being the larger pores having a pore diameter within a range of 10 μm to 25 μm. Thus, it becomes possible to obtain a high-quality multi-gradational printing image. Thus, the p improved.

BRIEF DESCRIPTION OF THE DRAWINGS

The above and other objects, features and advantages of the present invention will become more apparent from the following detailed description which are to be read in conjunction with the accompanying drawings, in which.

DESCRIPTION OF THE PREFERRED EMBODIMENTS

Figure 1:
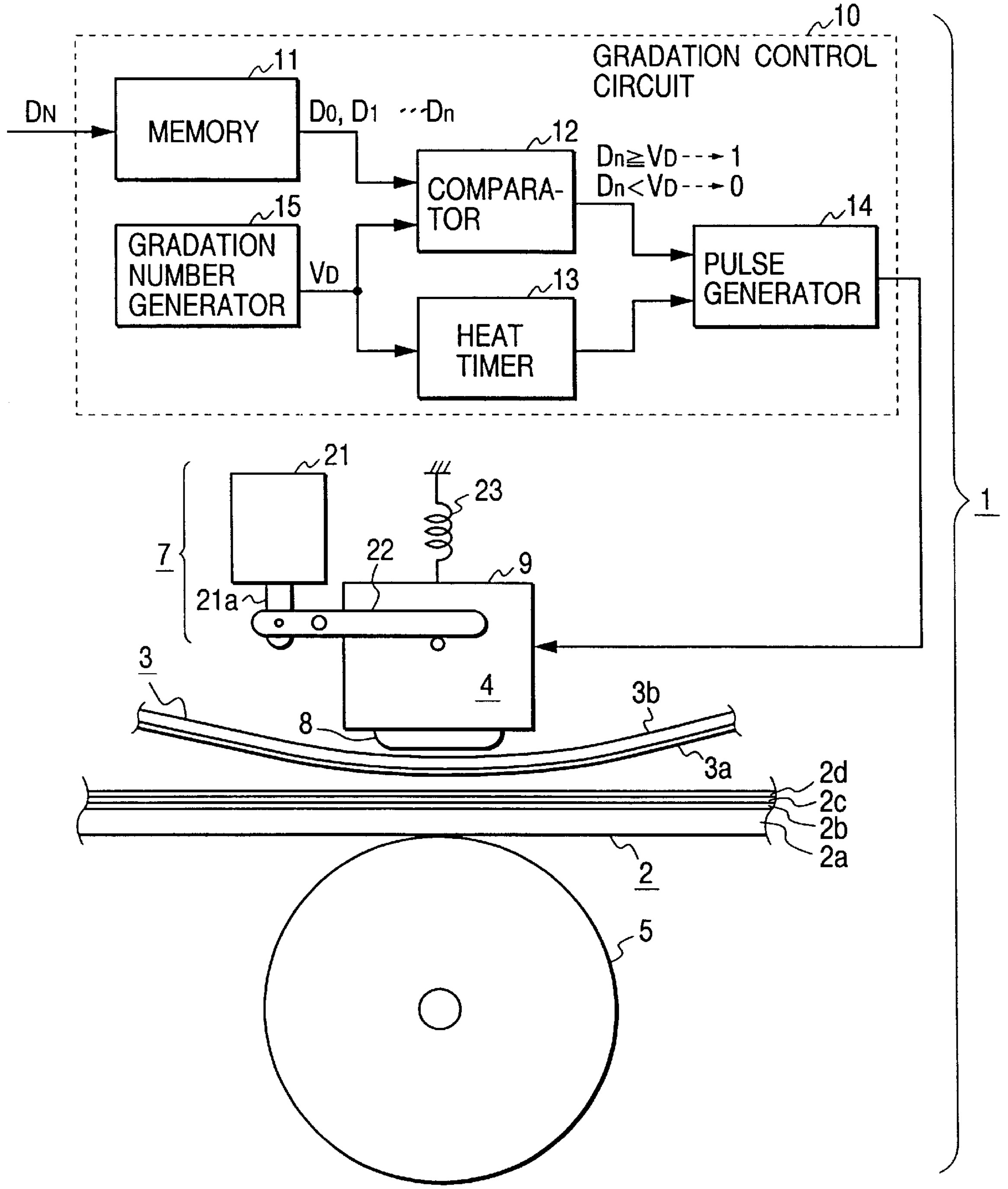
FIG. 1 is a schematic view showing a melt-type thermal transfer printing apparatus in accordance with a first embodiment of the present invention.

Preferred embodiments of the present invention will be explained with reference to the accompanying drawings. Identical parts are denoted by the same reference numerals throughout the views.

First Embodiment

A first embodiment of the present invention will be explained hereinafter with reference to the accompanied drawings.

FIG. 1 is a schematic view showing a melt-type thermal transfer printing apparatus in accordance with the first embodiment of the present invention.

According to a melt-type thermal transfer printing apparatus 1 of the first embodiment, a melt-type thermal transfer printing sheet 2 (hereinafter referred to as printing sheet 2) serves as a recording medium. An ink ribbon 3 is brought into contact with the printing sheet 2. A thermal head 4 is provided to press the ink ribbon 3. Both of printing sheet 2 and ink ribbon 3 are sandwiched between the thermal head 4 and a platen roller 5. The platen roller 5 rotates to convey the printing sheet 2. A pressing device 7 generates a predetermined force for pressing the thermal head 4. A gradation control circuit 10 controls an electric power supplied to the thermal head 4 to vary a melt or fusion area of ink 3_a_ so as to obtain a multi-gradational image on the printing sheet 2.

Ink ribbon 3 comprises hot melt or heat fusible ink 3_a_ coated on a polyester (PET) thin film 3_b_. The hot melt ink 3_a_ is faced down when pressed by the thermal head 4 so that the hot melt ink 3_a_ is directly brought into contact with the surface of the printing sheet 2.

Thermal head 4 comprises a plurality of heater elements 8, - - - , 8 arranged in line. These heater elements 8, - - - , 8 are incorporated a head case 9.

Gradation control circuit 10 comprises a memory 11, a comparator 12, a heat timer 13, a pulse generator 14, and a gradation number generator 15. The memory 11 memorizes image data ($D_N$) representing gradation numbers corresponding to images to be printed. The comparator 12 compares each of image data ($D_0$, $D_1$, - - - , $D_n$) of respective gradation levels generated from the memory 11 with a gradation number ($V_D$) produced from the gradation number generator 15. The heat timer 13 sets a heat time in accordance with each gradation. And, the pulse generator 14 supplies a pulse signal to the heater element 8 of the thermal head 4 to increase the temperature of heater element 8 based on an output of the comparator 12 and an output of the heat timer 13.

As a result of a comparison between the image data ($D_0$, $D_1$, - - - , $D_n$) and the gradation number ($V_D$), the comparator 12 generates a signal of 1 when $D_N \geqq V_D$ and generates a signal of 0 when $D_N < V_D$.

Pressing device 7 comprises a plunger 21, a push rod 22 linked with a rod 21*a* of plunger 21, and a return spring 23 attached to the thermal head 4. When plunger 21 is operated, the push rod 22 is rotated or swung about its pivot center to shift the thermal head 4 toward the platen roller 5. Thus, the printing sheet 2 and the ink ribbon 3 are held or sandwiched together between the thermal head 4 and the platen roller 5.

Figure 2A:
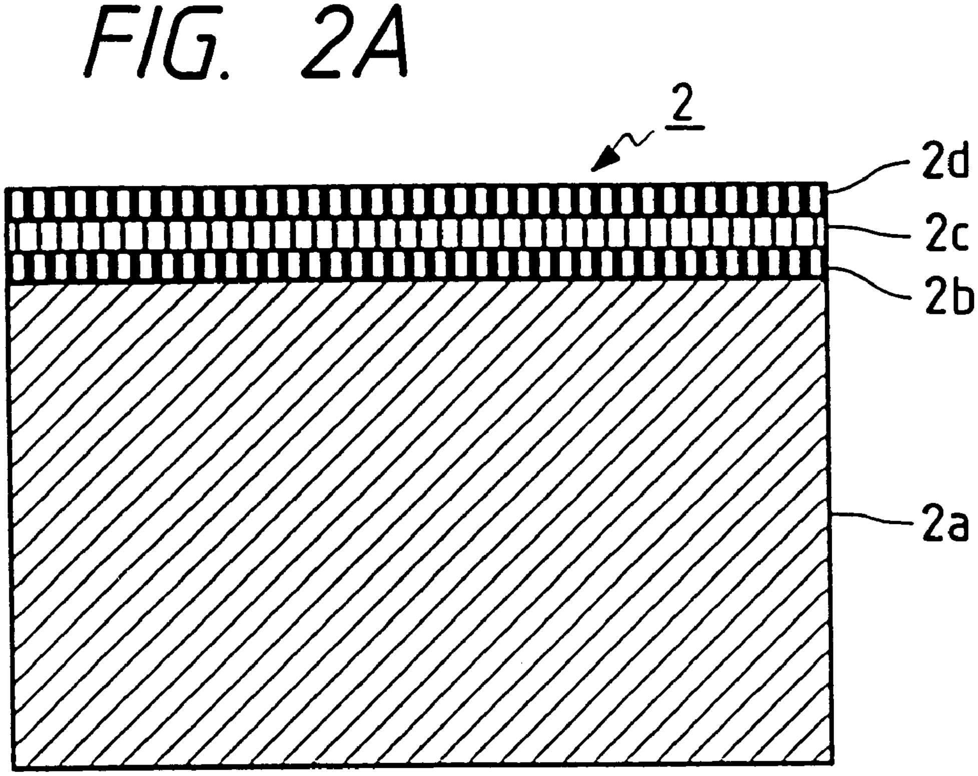
FIGS. 2A and 2B are cross-sectional views showing the melt-type thermal transfer printing sheets in accordance with the first embodiment of the present invention.
Figure 2B:
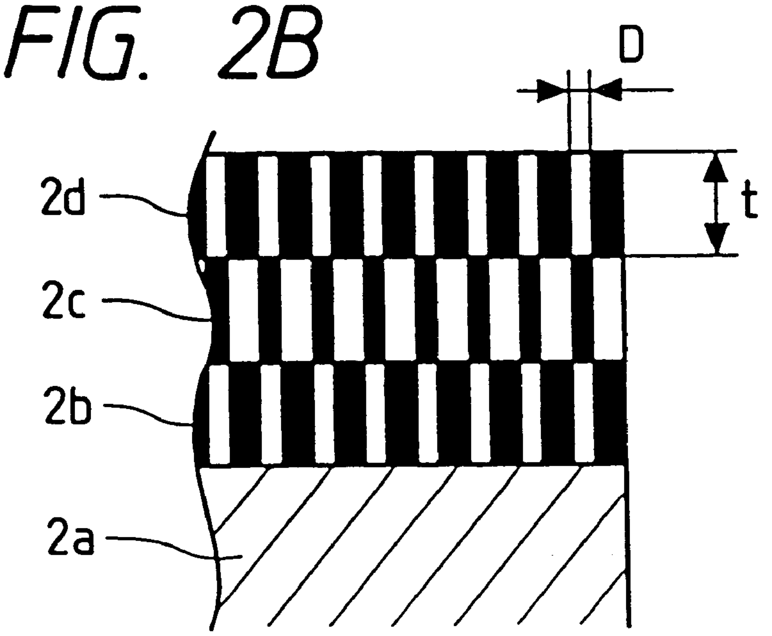

FIGS. 2A and 2B are cross-sectional views showing a melt-type thermal transfer printing sheet in accordance with the first embodiment of the present invention. FIG. 2B is an enlarged view of FIG. 2A.

Printing sheet 2 comprises a base material 2*a*, a third porous layer 2*b* formed on the surface of this base material 2*a*, a second porous layer 2*c* accumulated on this third porous layer 2*b*, and a first porous layer 2*d* accumulated on this second porous layer 2*c*.

The base material 2*a* is chiefly made of pulp. Each of the first to third porous layers 2*b*, 2*c* and 2*d* has a pore diameter D equal to or less than 25 μm and has a thickness "t" of 10 μm.

Figure 3:
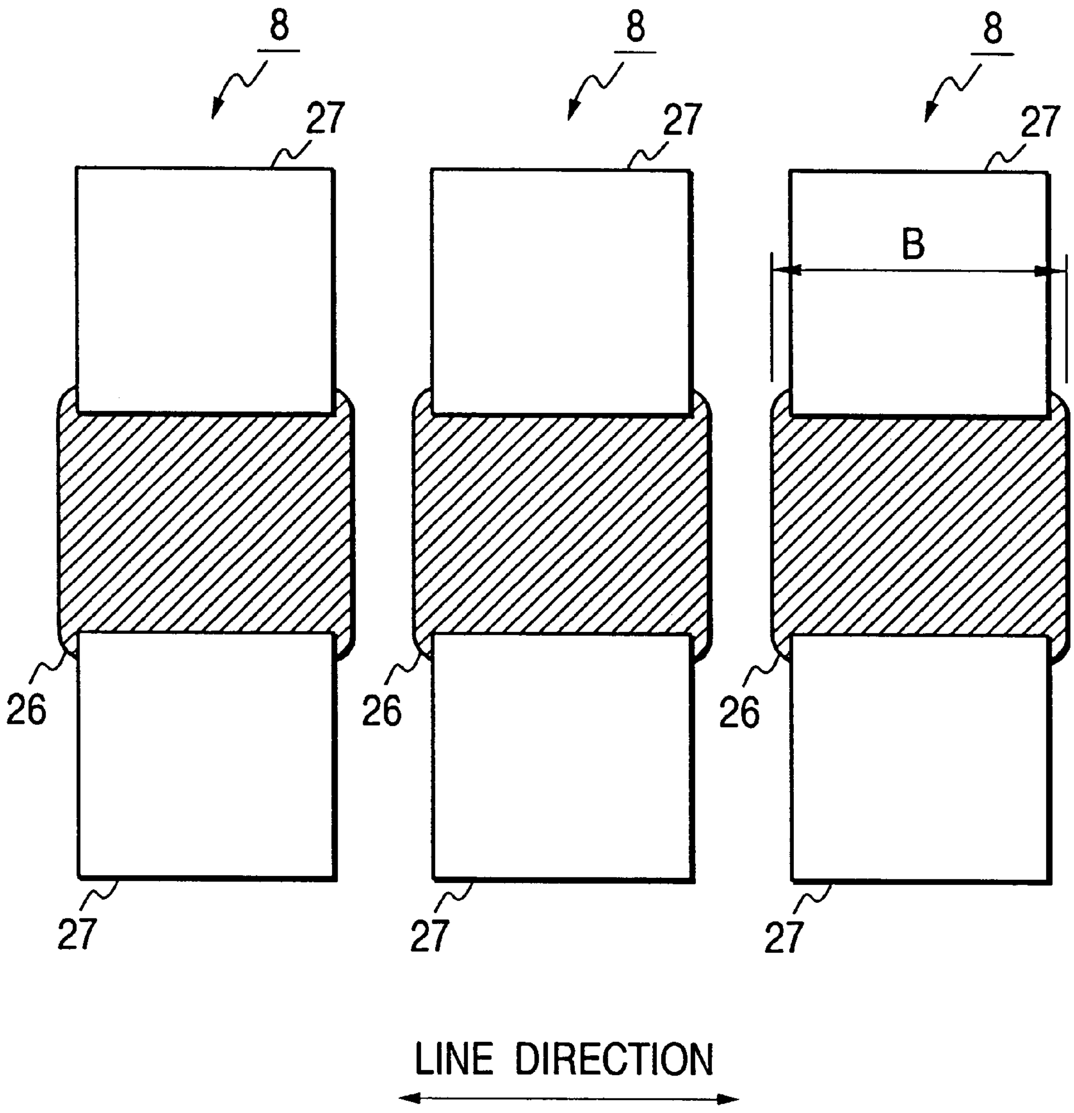
FIG. 3 is a front view showing the heater elements of the thermal head in accordance with the first embodiment of the present invention.

FIG. 3 is a front view showing the heater elements 8 of the thermal head 4 in accordance with the first embodiment of the present invention.

Each heater element 8 comprises a heater resistor 26 and a pair of electrodes 27, 27 connected to opposite ends of the heater resistor 26. A heater width B (i.e., a width in a line direction) of each heater element 8 is wider than the pore diameter D of porous layers 2*b*, 2*c* and 2*d* of the printing sheet 2 shown in FIG. 2B. With this relationship, the heater element 8 can surely press a pore in the porous layer.

Next, an operation of the melt-type thermal transfer printing apparatus 1 will be explained.

Figure 4A:
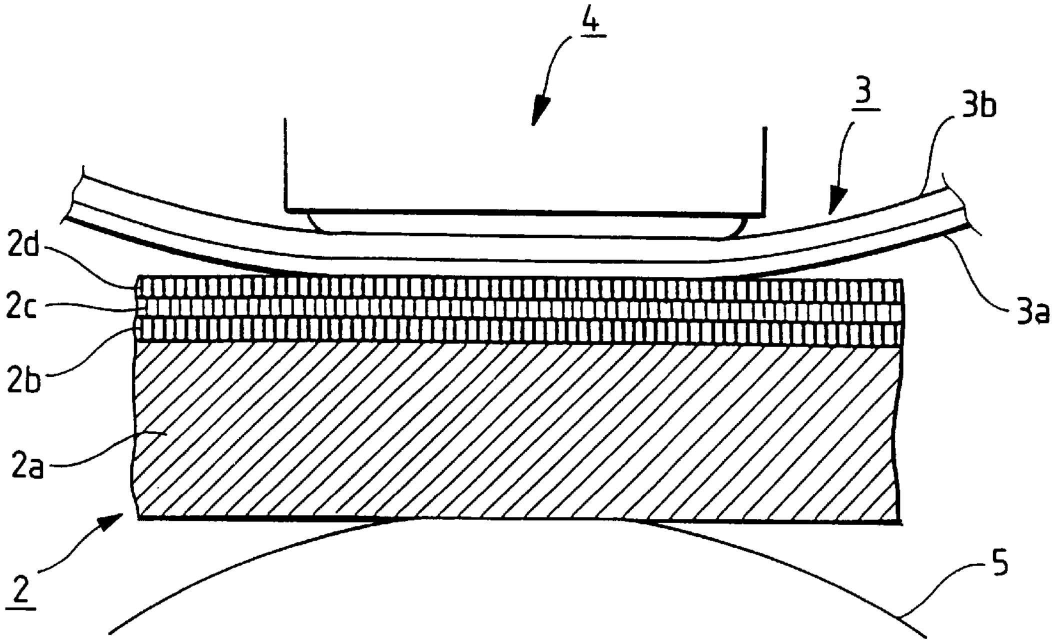
FIGS. 4A and 4B are views illustrating the operation of the melt-type thermal transfer printing apparatus in accordance with the first embodiment of the present invention.
Figure 4B:
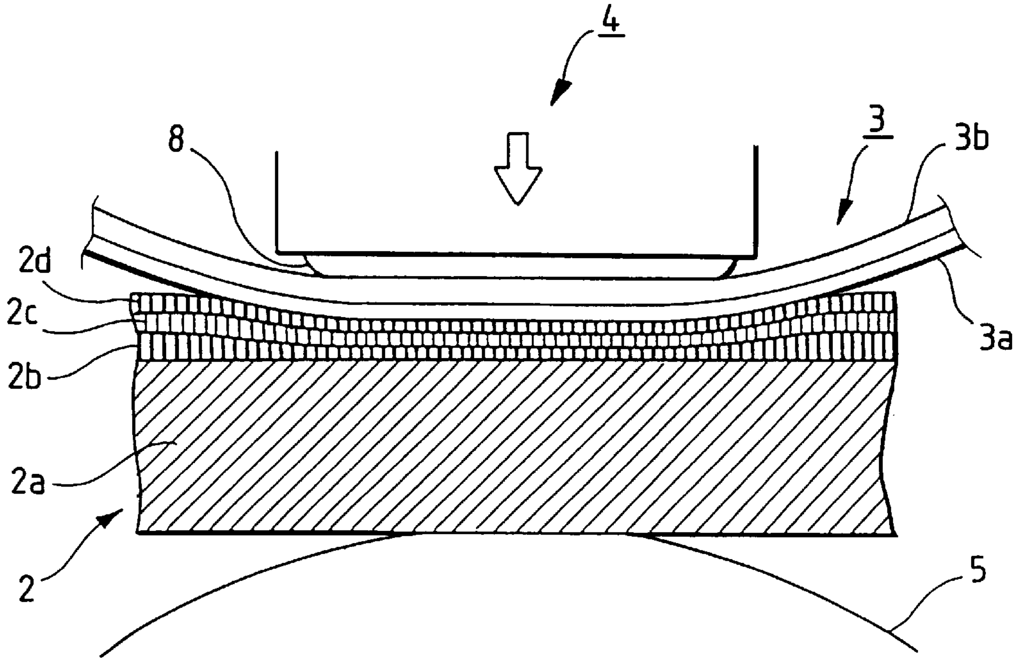

FIGS. 4A and 4B are views illustrating the operation of the melt-type thermal transfer printing apparatus 1 in accordance with the first embodiment of the present invention.

In FIG. 4A, the ink ribbon 3, comprising the hot melt or heat fusible ink 3*a* coated on the thin film 3*b*, is placed on the printing sheet 2. The ink 3*a* of ink ribbon 3 is faced down and directly brought into contact with the uppermost (i.e., first) porous layer 2*d* of the printing sheet 2. Both of the printing sheet 2 and the ink ribbon 3 are held between the thermal head 4 and the platen roller 5.

Next, as shown in FIG. 4B, the thermal head 4 is shifted in a direction indicated by a void arrow. Thus, both of the printing sheet 2 and the ink ribbon 3 are pressed by the thermal head 4 shifting toward the platen roller 5. Each thickness of porous layers 2*b*, 2*c* and 2*d* is reduced in accordance with a pressing force applied from the thermal head 4, as if these porous layers 2*b*, 2*c* and 2*d* were united.

In this condition, a pulse signal is sent to the heater elements 8, - - - , 8 of thermal head 4. Upon generation of this pulse signal, a desirable gradational characteristic is surely obtained due to a three-layer construction of the porous layers 2*b*, 2*c* and 2*d* even if these porous layer 2*b*, 2*c* and 2*d* have a pore diameter equivalent to 25 μm. Thus, it becomes possible to obtain a high-resolution, high-quality, multi-gradational printing image co conventional image realized by using a single porous layer having a small pore diameter of 1–10 μm disclosed in the previously explained Published Japanese Patent Application No. 07125468 A/1995

Figure 5A:
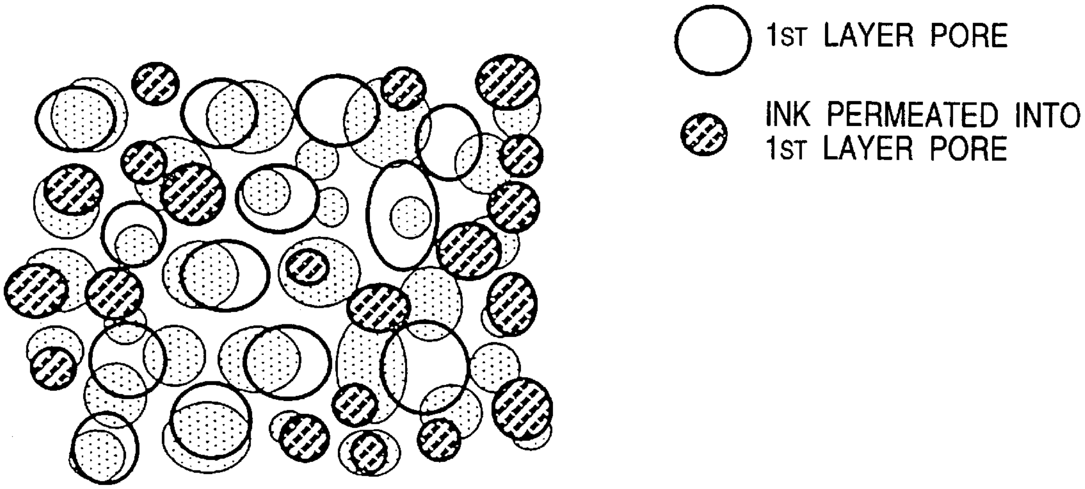
FIGS. 5A and 5B are views illustrating the condition of ink transferred to the printing sheet of the first embodiment of the present invention.
Figure 5B:
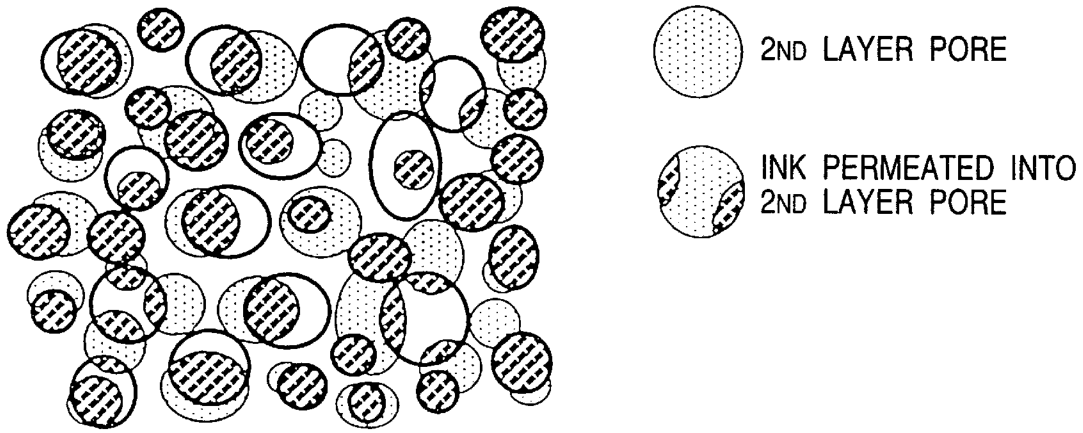

FIGS. 5A and 5B are views illustrating the condition of ink transferred or permeated to a printing sheet of the first embodiment of the present invention. In this example, the printing sheet comprises two porous layers containing numerous pores having a pore diameter in a range up to about 25 μm. A pressing force applied on this printing sheet is variably controlled to change the degree of transferred or permeated ink.

As shown in FIG. 5A, a pressing force was added to the printing sheet by a degree solely allowing the ink to permeate into the pores of the first (i.e., uppermost) layer indicated by void circles. As indicated by bold slanting lines, the ink was transferred to the first layer at a limited region corresponding to smaller pores having a pore diameter in a range of 1 to 10 μm among all the pores whose diameters are limited within 25 μm. Then, the pressing force was increased to a higher level allowing the ink to permeate deeply into the second-layer pores indicated by dotted circles as well as the first-layer pores. As a result, as shown in FIG. 5B, the ink was transferred to the second layer not only at a region corresponding to the smaller pores having a pore diameter of 1 to 10 μm but also at another region where the larger first-layer pores having a pore diameter of 11 to 25 μm are overlapped with the larger second-layer pores having a pore diameter of 11 to 25 μm.

Accordingly, a desirable multi-gradational characteristics was realized.

Figure 6:
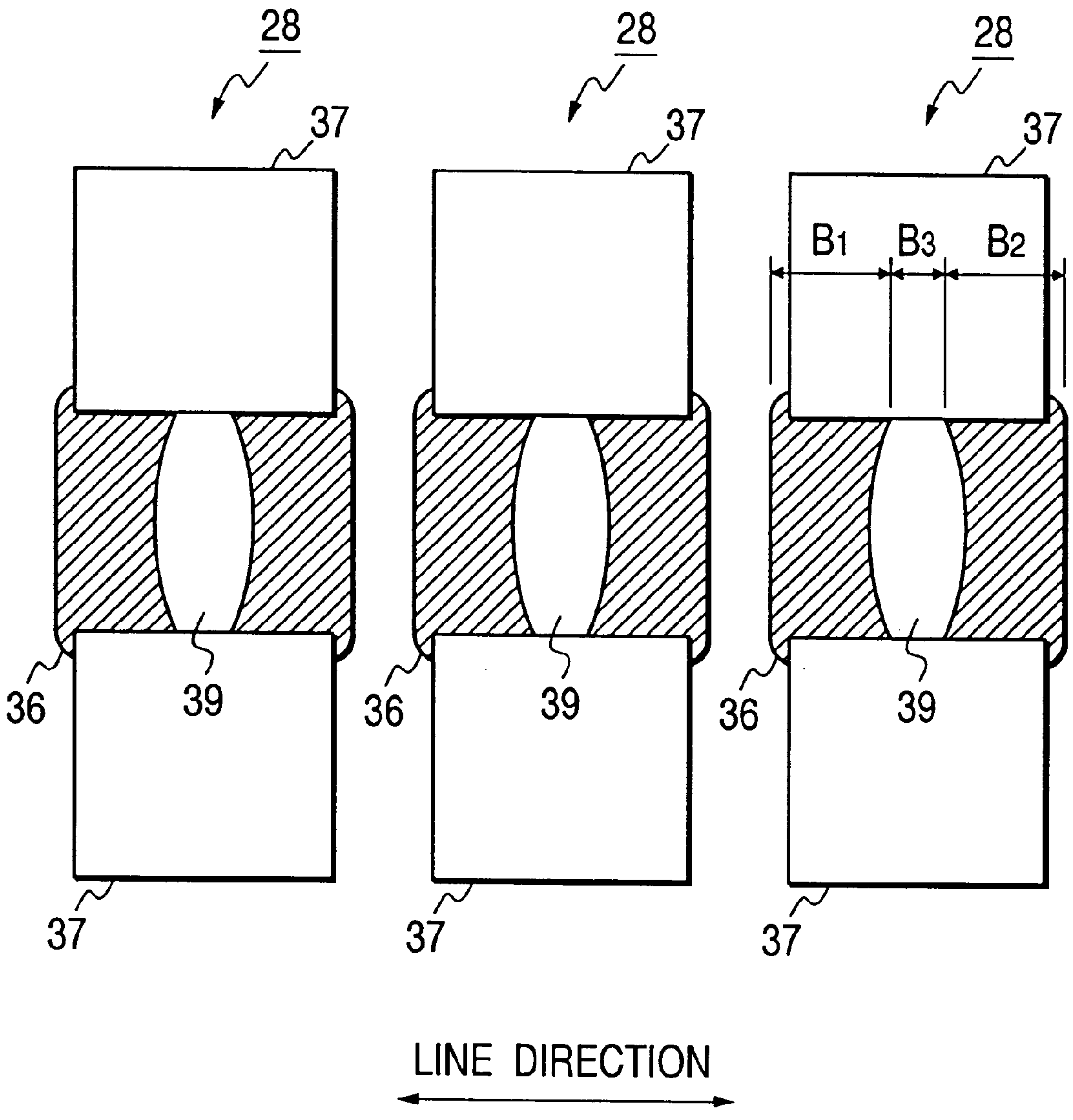
FIG. 6 is a front view showing a modification of the heater elements of the thermal head in accordance with the first embodiment of the present invention.

FIG. 6 is a front view showing a modification of heater elements of the thermal head in accordance with the first embodiment of the present invention.

Each heater element 28 comprises a heater resistor 36 and a pair of electrodes 37, 37 connected to opposite ends of the heater resistor 36. Two heater widths B1 and B2 of each heater element 28 are respectively wider than the pore diameter D of porous layers 2*b*, 2*c* and 2*d* of the printing sheet 2 shown in FIG. 2B. With this relationship, the heater element 28 can surely press a pore in the porous layer.

According to this modified arrangement, a groove 39 is provided at a center of each heater resistor 36. The heater resistor 36 serves as two recording dots for a lower gradation, while the heater resistor 36 serves as a single recording dot for a higher gradation. In this manner, by providing the groove 39 at the center of each heater resistor 36, numerous multi-gradational levels can be realized.

Furthermore, a used printing sheet has a porous layer having a pore diameter equivalent to or smaller than 25 μm. The entire width of each heater resistor 36 is set to 70 μm and the width B3 of the groove 39 is set to 10 to 20 μm.

EXAMPLES

Various examples relating to the first embodiment of the present invention will be explained hereinafter.

Common test conditions for inventive example 1 and comparative examples 1 and 2a are as follows:

Ink ribbon: using a thin film of polyester (PET) t=3.5 μm

Ink coating amount: 1.5 g/$m^2$, density 1.7 (OD)

Thermal head: thin film head type

Heater resistor: having a rectangular shape of 70 μm in width×100 μm in length

Pressure applied between thermal head and platen roller: 0.4 kg/$cm^2$

Surface hardness of platen roller: JIS K 6031 approximately 60 degrees

Gradation number points of image data: a total of 9 levels of 0, 32, 64, 96, 128,160, 192, 224 and 256

Exclusive test conditions for inventive example 1 is as follows:

Base material: plain paper

Porous layer: three-layer arrangement with a pore diameter within 25 μm

Exclusive test conditions for comparative example 1 is as follows:

Base material: synthetic paper

Porous layer: single-layer arrangement with a pore diameter of 1–10 μm

Exclusive test conditions for comparative example 2 is as follows:

Base material: plain paper

Porous layer: three-layer arrangement with a pore diameter within 35 μm

Printing operations are performed on respective porous layers formed on associated base materials according to the inventive example 1 and the comparative examples 1 and 2 under the above-described test conditions, to check a relationship between the gradation number and the density (OD=optical density).

Figure 7:
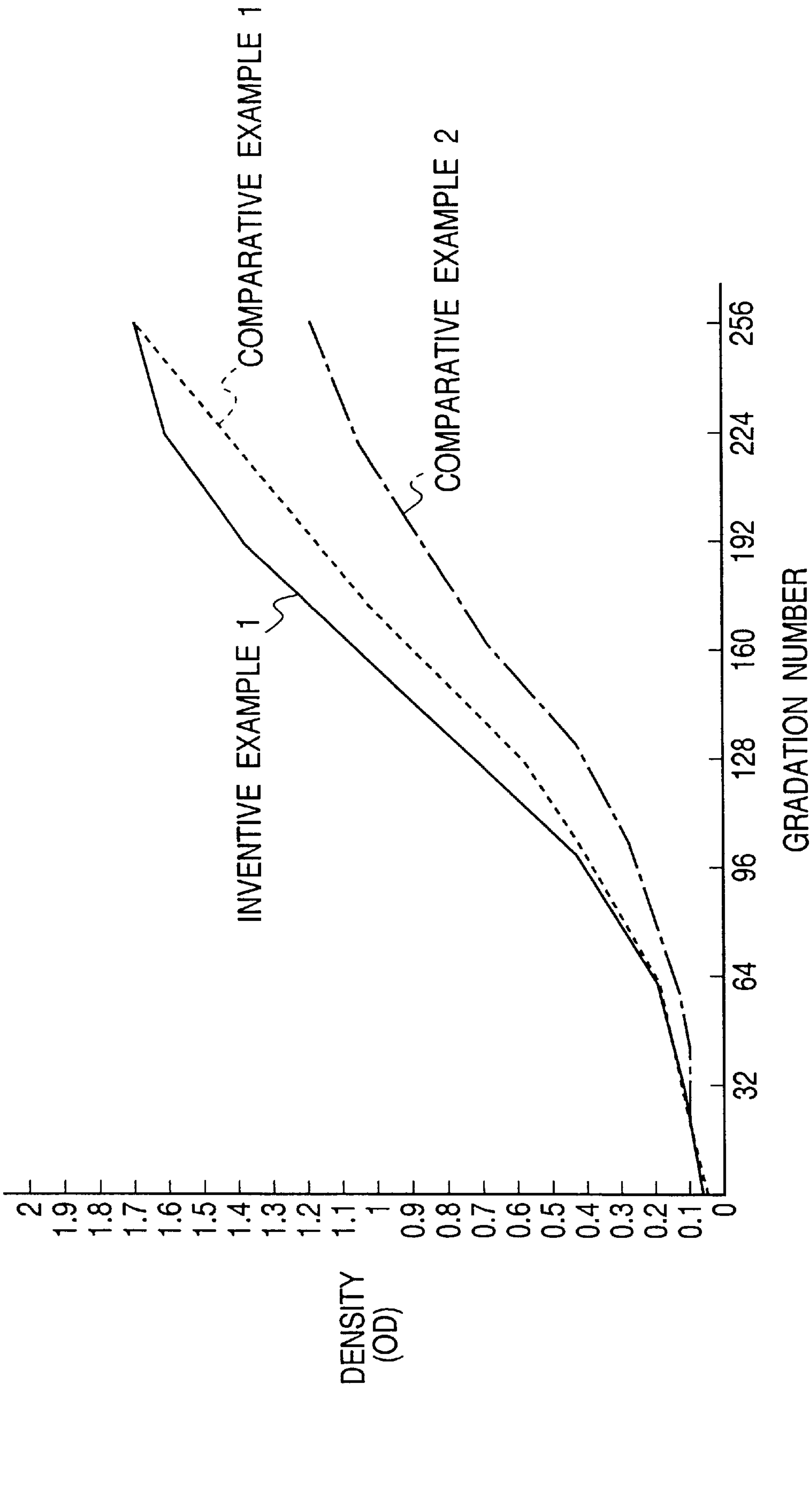
FIG. 7 is a graph showing the characteristics between the gradation number and the density (i.e., multi-gradational characteristics) obtained from an inventive example 1, a comparative example 1 and a comparative example 2.

FIG. 7 is a graph showing the resultant characteristics between the gradation number and the density (i.e., multi-gradational characteristics) obtained from the inventive example 1 and the comparative examples 1 and 2. An abscissa represents the gradation number, while an ordinate represents the density (OD).

In the gradation-number vs. density characteristics shown in FIG. 7, the excellency in the multi-gradational characteristics is judged based on the following two indices:

(1) "having a better linearity"; and (2) "having a large density difference between 0 gradation level and 256 gradation level."

The comparative example 1, using a conventional printing sheet made of the synthetic paper formed with a single porous layer having a pore diameter of 1 to 10 μm, demonstrated a desirable multi-gradational characteristics. A good linearity was obtained in a full range from 0 to 256 gradation levels as indicated by a dotted line. The density at the 256 gradation is 1.7 (OD).

The linearity and the density difference obtained by the comparative example 1 are taken into consideration for evaluating the characteristics of the inventive example 1 and the comparative example 2.

The inventive example 1, using a printing sheet of the present invention having a three-layered porous arrangement having a pore diameter in a range to about 25 μm, demonstrated a multi-gradational characteristics comparable with that of the comparative example 1. Especially in a range from 96 to 192 gradation levels, a solid line representing the gradational characteristics of the present invention is steep in gradient compared with the dot line representing the gradational characteristics of the comparative example 1. In general, a plain paper has a smaller thermal diffusibility compared with a synthetic paper. This is why the gradient of the solid line becomes steep in the range of 96 to 192. In other words, the present invention makes it possible to reduce the electric power consumption during a printing operation due to the small thermal diffusibility of the plain paper. In this respect, the inventive example 1 is superior to the comparative example 1. The inventive example 1 employs a multilayered porous arrangement. With this arrangement, the inventive example 1 obtains an effect substantially the same as that of the comparative example 1 even though the maximum pore diameter of the porous layer is 25 μm which are significantly larger than 10 μm of the comparative example 1. Providing numerous pores is effective to suppress the heat diffusion. Furthermore, the inventive example 1 has the maximum density of 1.7 (OD) equal to that of the comparative example 1.

Comparative example 2, using a printing sheet comprising a porous layer having a pore diameter within 35 μm, demonstrated a multi-gradational characteristics inferior to that of the inventive example 1 or comparative example 1. As shown by an alternate long and short dash line, the linearity of the comparative example 2 is acceptable. However, the density of the 256 gradation level is 1.2 (OD) which are fairly low compared with 1.7 (OD) of the inventive example 1 or comparative example 1.

The comparative example 2 has a porous layer whose maximum pore diameter is 35 μm, which are significantly large compared with 25 μm of the comparative example 1. Having a too much large pore diameter is disadvantageous in that the ink cannot be diffused effectively along the surface of each pore. Thus, even if the above-described multilayered porous arrangement is employed, the obtainable maximum density is reduced or limited due to insufficiency in the diffusion of ink in the relatively large pores. Accordingly, it is difficult to realize a satisfactory density difference.

As apparent from the foregoing description, the inventive example 1 brings excellent printing characteristics equivalent to that of the comparative example 1 and superior to that of the comparative example 2.

Second Embodiment

A second embodiment of the present invention will be explained hereinafter with reference to the accompanied drawings.

Figure 8:
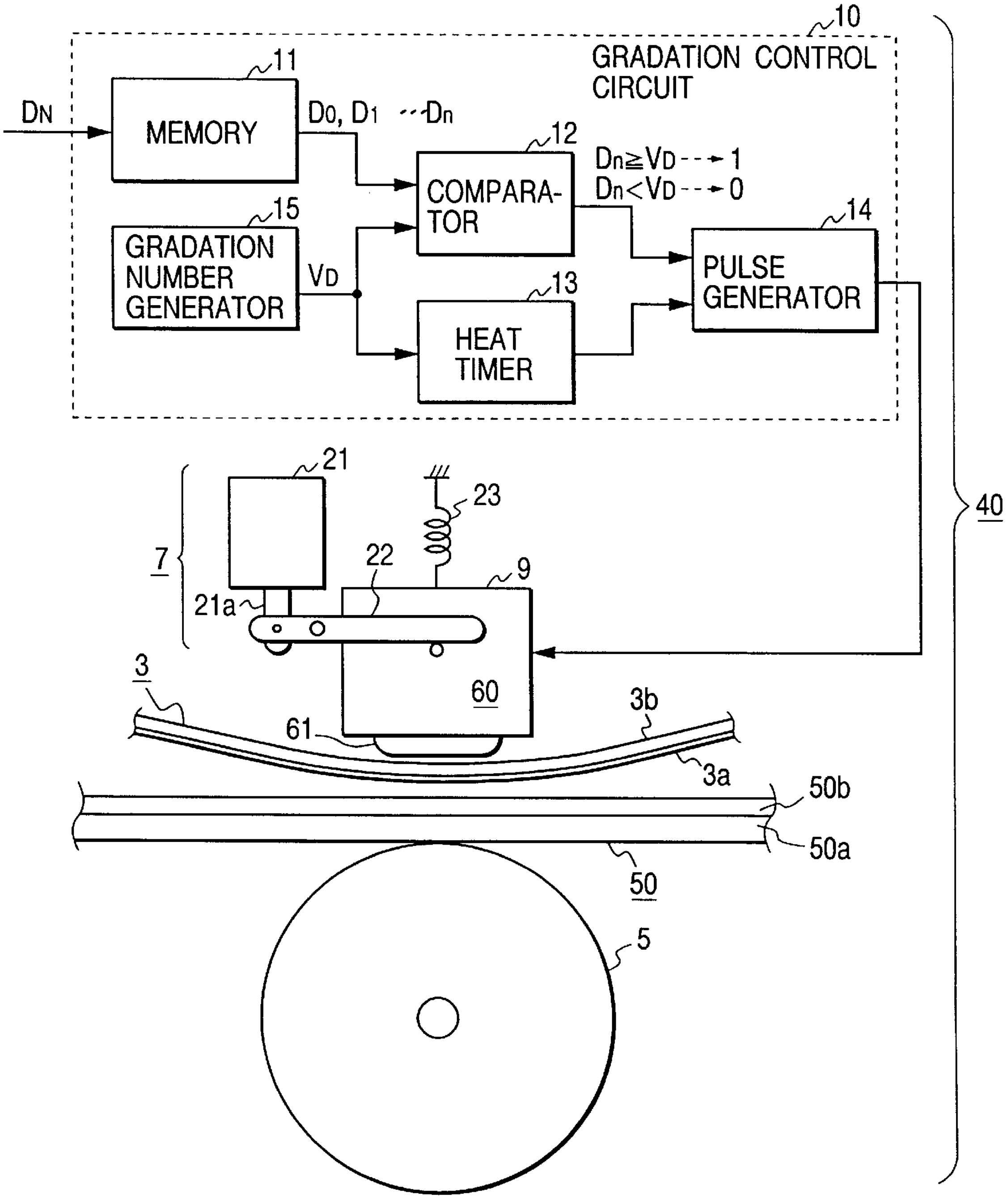
FIG. 8 is a schematic view showing a melt-type thermal transfer printing apparatus in accordance with a second embodiment of the present invention.

FIG. 8 is a schematic view showing a melt-type thermal transfer printing apparatus in accordance with the second embodiment of the present invention. In FIG. 8, the components already disclosed in the melt-type thermal transfer printing apparatus 1 of the first embodiment are denoted by the same reference numerals and will not be explained in detail.

According to a melt-type thermal transfer printing apparatus 40 of the second embodiment, a melt-type thermal transfer printing sheet 50 (hereinafter referred to as printing sheet 50) serves as a recording medium. An ink ribbon 3 is brought into contact with the printing sheet 50. A thermal head 60 is provided to press the ink ribbon 3. Both of printing sheet 50 and ink ribbon 3 are held or sandwiched between the thermal head 60 and a platen roller 5. A pressing device 7 generates a predetermined force for pressing the thermal head 60. A gradation control circuit 10 controls an electric power supplied to the thermal head 60 to vary a melt or fusion area of ink 3*a* so as to obtain a multi-gradational printing image on the printing sheet 50.

Figure 9:
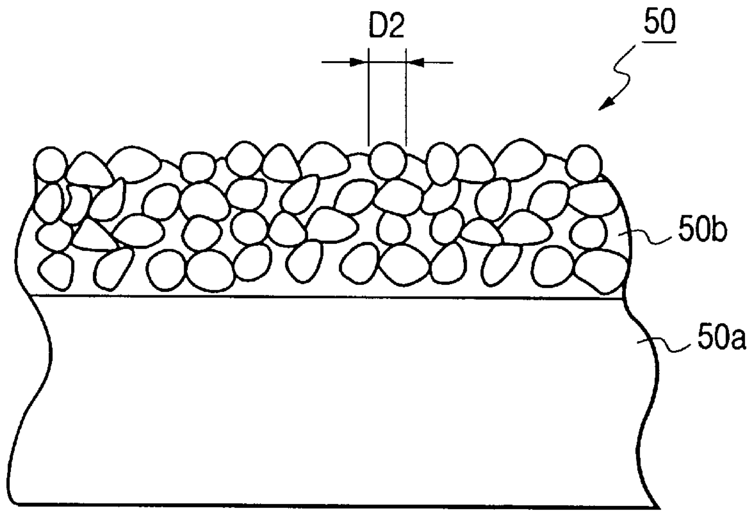
FIG. 9 is a cross-sectional view showing a melt-type thermal transfer printing sheet in accordance with the second embodiment of the present invention.

FIG. 9 is a cross-sectional view showing a melt-type thermal transfer printing sheet in accordance with the second embodiment of the present invention. A printing sheet 50 comprises a base material 50*a*, and a porous layer 50*b* formed on the surface of this base material 50*a*.

The base material 50*a* is chiefly made of a synthetic paper or pulp. The porous layer 50*b* contains numerous pores having a pore diameter D2 in a range to about 25 μm and accumulated in a multilayered arrangement in the region layer 50*b*. The pores contained in the porous layer 50*b* are formed simultaneously by the same step without forming each layer independently.

At least 80% of the pores involved in the porous layer 50*b* are smaller pores having a pore diameter in a range to about 10 μm and the remainder are being larger maximum pores in a range of 10 to 25 μm.

Using the printing sheet 50 comprising the base material 50*a* and the porous layer 50*b*, when at least 80% of the pores involved in the porous layer 50*b* are the smaller pores maximum having a pore diameter in a range to about 10 μm and the remainder are the larger pores in a range of 10 to 25 μm, makes it possible to obtain a high-quality multi-gradational image and improve the productivity.

Figure 10:
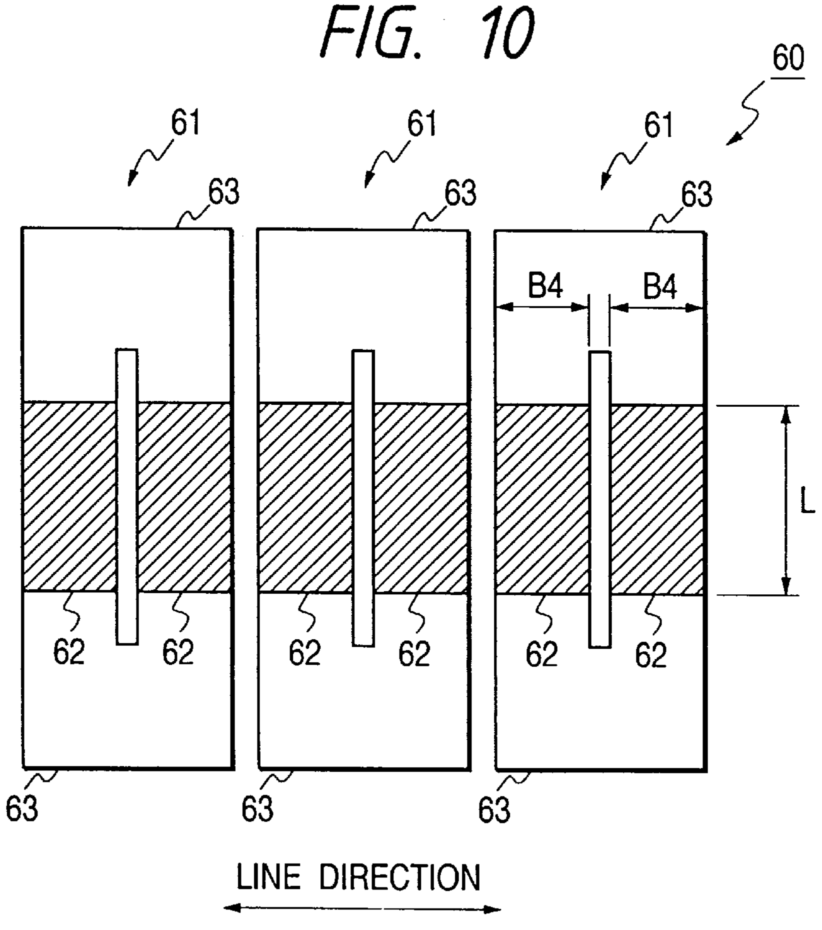
FIG. 10 is a front view showing the heater elements of the thermal head in accordance with the second embodiment of the present invention.

FIG. 10 is a front view showing the heater elements of the thermal head in accordance with the second embodiment of the present invention.

The thermal lead 60 comprises a plurality of heater elements 61, - - - , 61 arranged in line. These heater elements 61, - - - , 61 are incorporated or housed in a head case (not shown).

Each heater element 61 comprises two split heater resistors 62, 62 and a pair of electrodes 63, 63 each connected to these heater resistors 62, 62. A heater width B4, B4 and a length L of each heater resistor 62 are larger than the maximum pore diameter in the porous layer 50B. In this second embodiment, this value needs to be equal to or larger than 25 μm.

Figure 11:
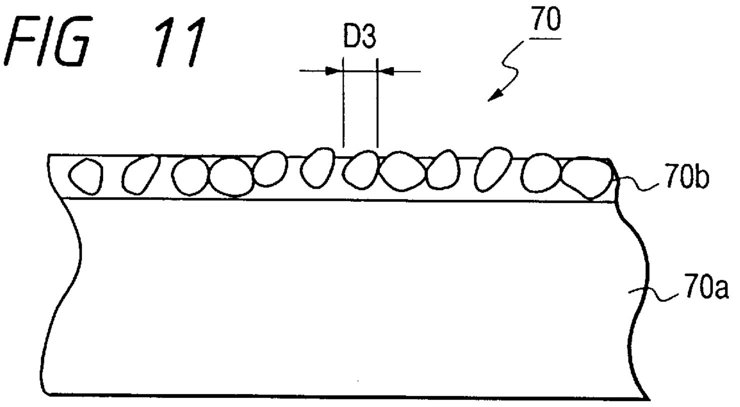
FIG. 11 is a cross-sectional view showing another melt-type thermal transfer printing sheet in accordance with the second embodiment of the present invention.

FIG. 11 is a cross-sectional view showing another melt-type thermal transfer printing sheet in accordance with the second embodiment of the present invention. A melt-type thermal transfer printing sheet 70 (hereinafter referred to as printing sheet 70) comprises a base material 70*a*, and a porous layer 70*b* formed on the surface of this base material 70*a*.

The base material 70*a* is chiefly made of a synthetic paper or pulp. The porous layer 70*b* contains numerous pores having a pore diameter D3 in a range to about 25 μm and formed into a single layer arrangement simultaneously by the same step.

At least 80% of the pores of the porous layer 70*b* are smaller pores having a pore diameter in a range to about 10 μm and the remainder is being maximum larger maximum pores in a range of 10 to 25 μm.

The printing sheet 70 is excellent in the productivity compared with the above-described printing sheet 50 (refer to FIG. 9) which comprises the multilayered pore arrangement.

EXAMPLES

Examples relating to the second embodiment of the present invention will be explained hereinafter.

Test conditions for an inventive example 2 are as follows:

Ink ribbon: using a thin film of polyester (PET) t=3.5 μm

Ink coating amount: 1.5 g/m$^2$, density 1.7 (OD)

Thermal head: thin film head type

Heater resistor: rectangular shape of (70 μm in width×110 μm in length)×2 (refer to FIG. 10)

Pressure applied between thermal head and platen roller: 0.47 kg/cm$^2$

Surface hardness of platen roller: JIS K 6031 approximately 60 degrees

Gradation number points of image date: a total of 9 levels of 0, 32, 64, 96, 128, 160, 192, 224 and 256

TABLE 1

| Pore diameter (μm) | Sample A (%) | Sample B (%) | Sample C (%) | Sample D (%) | Sample E (%) | Sample F (%) |
|---|---|---|---|---|---|---|
| 1 to 3 | 100 | 85 | 55 | 46 | 5 | 2 |
| 4 to 6 | 0 | 11 | 31 | 26 | 10 | 4 |
| 7 to 9 | 0 | 4 | 5 | 15 | 18 | 6 |
| 10 to 12 | 0 | 0 | 4 | 7 | 31 | 10 |
| 13 to 15 | 0 | 0 | 2 | 2 | 16 | 23 |
| 16 to 18 | 0 | 0 | 1 | 2 | 8 | 26 |
| 19 to 21 | 0 | 0 | 1 | 1 | 4 | 11 |
| 22 to 24 | 0 | 0 | 1 | 1 | 3 | 8 |
| 25 & above | 0 | 0 | 0 | 0 | 5 | 10 |

Table 1 shows a distribution of pores in each printing sheet (samples A to F) in accordance with the inventive example 2. The printing sheet, comprising the base material and the porous layer formed thereon, is photographed by an electronic microscope to measure the distribution of the pores by visual observation.

The obtained test data of table 1 shows the following result:

In sample A, 100% is pores having a pore diameter in a range of 1 to 3 μm

In sample B, 85% of the pores have a pore diameter in a range of 1 to 3 μm and no pores have a pore diameter exceeding 10 μm;

In sample C, 55% of the pores have a pore diameter in a range of 1 to 3 μm and 31% of pores have a diameter in a range of 4 to 6 μm;

In sample D, 46% of the pores have a pore diameter in a range of 1 to 3 μm, 26% of the pores have a pore diameter in a range of 4 to 6 μm, and 15% of the pores have a diameter in a range of 7 to 9 μm;

In sample E, 10% of the pores have a pore diameter in a range of 4 to 6 μm, 18% of the pores have a pore diameter in a range of 7 to 9 μm, 31% of the pores have a diameter having a pore diameter in a range of 10 to 12 μm, 16% is pores in a range of 13 to 15 μm; and 5% of the pores have a diameter exceeding 25 μm; and In sample F, 10% of the pores have a pore diameter in a range of 10 to 12 μm, 23% of the pores have a pore diameter in a range of 13 to 15 μm, 26% of the pores have a pore diameter in a range of 16 to 18 μm, 11% of the pores have a diameter in a range of 19 to 21 μm; and 10% of the pores have a diameter exceeding 25 μm.

TABLE 2

| Recording | | Pore diameter distribution | | |
|---|---|---|---|---|
| sheet | Base material | 1–9 μm | 25 μm & above | Layer structure |
| Sample A | Synthetic paper | 100% | 0 | Multilayered |
| Sample B | Synthetic paper | 100% | 0 | Single layered |
| Sample C | plain paper | 91% | 0 | Multilayered |
| Sample D | plain paper | 87% | 0 | Multilayered |
| Sample E | plain paper | 33% | 5% | Multilayered |
| Sample F | plain paper | 12% | 10% | Multilayered |

Table 2 shows primary characteristics of each printing sheet (samples A to F) in accordance with the inventive example 2.

Each printing sheet is constituted as follows:

| | | | |
|---|---|---|---|
| Sample A | base material - synthetic paper | | |
| | layer structure - multilayer arrangement | | |
| | main pore diameter distribution | 1 to 9 μm | 100% |
| | | 25 μm and above | 0% |
| Sample B | base material - synthetic paper | | |
| | layer structure - single layer | | |
| | main pore diameter distribution | 1 to 9 μm | 100% |
| | | 25 μm and above | 0% |
| Sample C | base material - plain paper | | |
| | layer structure - multilayer arrangement | | |
| | main pore diameter distribution | 1 to 9 μm | 91% |
| | | 25 μm and above | 0% |
| Sample D | base material - plain paper | | |
| | layer structure - multilayer arrangement | | |
| | main pore diameter distribution | 1 to 9 μm | 87% |
| | | 25 μm and above | 0% |
| Sample E | base material - plain paper | | |
| | layer structure - multilayer arrangement | | |
| | main pore diameter distribution | 1 to 9 μm | 33% |
| | | 25 μm and above | 5% |
| Sample F | base material - plain paper | | |
| | layer structure - multilayer arrangement | | |
| | main pore diameter distribution | 1 to 9 μm | 12% |
| | | 25 μm and above | 10% |

Figure 12:
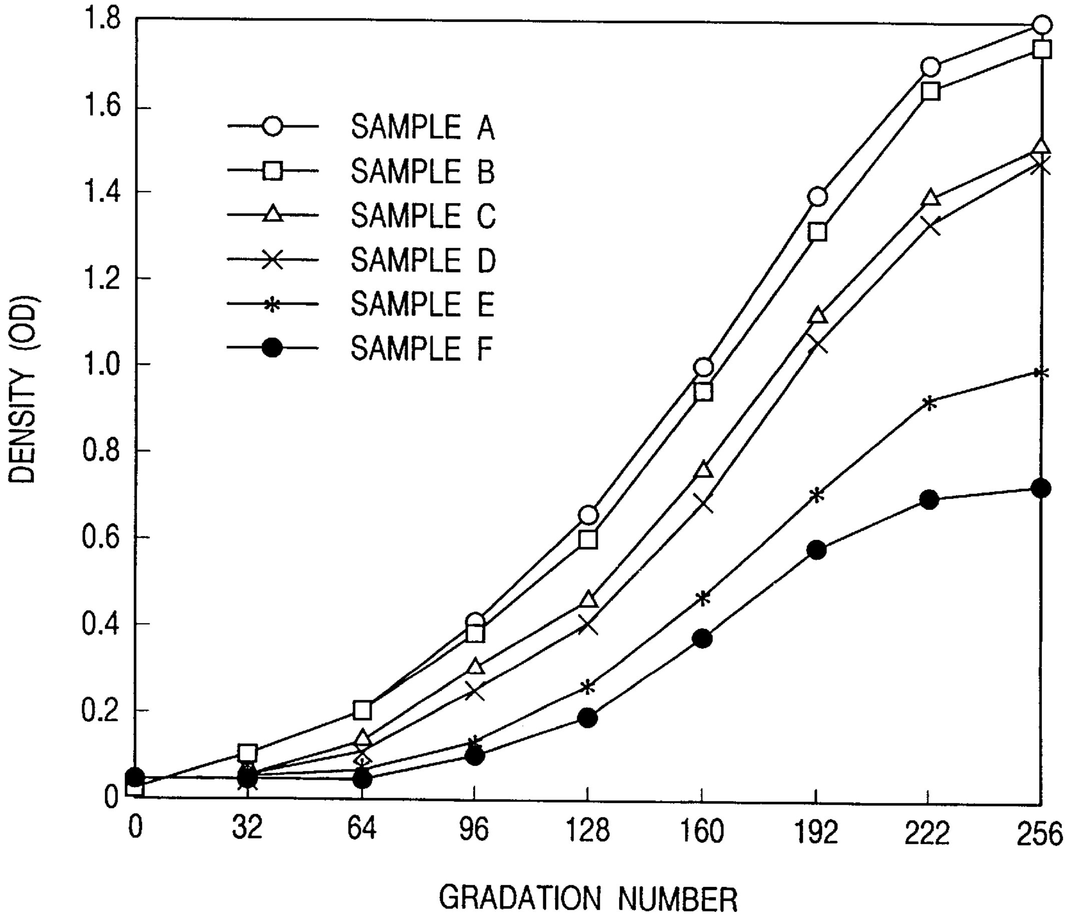
FIG. 12 is a graph showing characteristics between the gradation number and the density (i.e., multi-gradational characteristics) obtained from an inventive example 2.

FIG. 12 is a graph showing characteristics between the gradation number and the density (i.e., multi-gradational characteristics) obtained from the inventive example 2. An abscissa represents the gradation number, while an ordinate represents the density (OD).

Sample A, comprising a base material of synthetic paper and a multilayered porous layer comprising numerous pores 100% of which have a pore diameter of 1 to 9 μm and 0% have a pore diameter exceeding 25 μm, demonstrated a good linearity in a full range from 0 to 256 gradation levels as well as a higher maximum density reaching 1.8. A multi-gradational image having a better S/N and high quality was obtained in an actual printing operation using sample A.

Sample B, comprising a base material of synthetic paper and a porous single layer comprising numerous pores 100% of which have a pore diameter of 1 to 9 μm and 0% have a pore diameter exceeding 25 μm, demonstrated a good linearity in a fill range from 0 to 256 gradation levels as well as a higher maximum density reaching 1.74. The maximum density is slightly lower compared with the sample A. This is believed that a significant influence is given by the single layer construction of the porous layer and by an average pore diameter difference between sample A and sample B. A multi-gradational image having a better S/N and high quality was obtained in an actual printing operation using sample B.

The sample B printing sheet, comprising a single porous layer, not only brings an excellent gradation number vs. density characteristics comparable with that of the sample A printing sheet but also has a better productivity leading the multilayer type.

Sample C, comprising a base material of plain paper and a multilayered porous layer comprising numerous pores 91% of which have a pore diameter of 1 to 9 μm and 0% have a pore diameter exceeding 25 μm, demonstrated a good linearity in a limited range from 96 to 256 gradation levels as well as a relatively higher maximum density reaching 1.5. An actual printing condition of sample C is practically acceptable although the density is slightly low.

Sample D, comprising a base material of plain paper and a multilayered porous layer comprising numerous pores 87% of which have a pore diameter of 1 to 9 μm and 0% has a pore diameter exceeding 25 μm, demonstrated a good linearity in a limited range from 96 to 256 gradation levels as well as a relatively higher maximum density reaching 1.45. An actual printing condition of sample D is practically acceptable although the density is slightly low.

In short, when at least 87% of the pores in the porous layer are smaller pores having a pore diameter in a range 1 to 9 μm and 0% of the pores exceed 25 μm, the printing sheet can be practically acceptable even if its base material is made of plain paper.

Sample E, comprising a base material of plain paper and a multilayered porous layer comprising numerous pores 33% of which have a pore diameter of 1 to 9 μm and 5% have a pore diameter exceeding 25 μm, demonstrated a relatively lower maximum density reaching 1.0. An image obtained by sample E was not practically acceptable in its worse S/N, lower density and void-like printing finish.

Sample F, comprising a base material of plain paper and a multilayered porous layer comprising numerous pores 12% of which have a pore diameter of 1 to 9 μm and 10% have a pore diameter exceeding 25 μm, demonstrated the lowest maximum density reaching 0.72. An image obtained by sample F was not practically acceptable in its worse S/N, lower density and void-like printing finish.

From the foregoing, when at least 80% of the pores in the single or multilayered porous layer formed on a base material are smaller pores having a pore diameter not exceeding 10 μm and the remainder are pores in a range of 10 to 25 μm, the printing sheet can be practically used and acceptable in the multi-gradational characteristics as well as image quality.

With the above-described arrangements, the present invention brings the following effects.

One aspect of the present invention provides a melt-type thermal transfer printing apparatus using an ink ribbon brought into contact with a recording medium both of which are pressed by a thermal head under a control of an electric power supplied to the thermal head so that a melt or fusion area of ink can be varied to obtain a multi-gradational image on the recording medium. The recording medium is a porous surfaced medium including a plurality of porous layers accumulated on a base material. A pore diameter of each porous layer is in a range to about 25 μm. The ink ribbon is coated with a hot melt or heat fusible ink. A preferable range of the coating amount of the hot melt or heat fusible ink is a density equal to or less than 2.5 $g/m^2$. The thermal head has a plurality of heater elements arranged in line. Each heater element has a width larger than the pore diameter of the porous layer.

That is, by using the accumulated plurality of porous layers having a relatively larger pore diameter, the present invention makes it possible to realize a high-density multi-gradational printing image comparable with the conventional image realized by using a porous layer having a smaller pore diameter. Accordingly, the multi-gradational image recording can be easily realized by using melt-type ink and a printing sheet comprising plain paper as a base material.

Furthermore, it is preferable that the above melt-type thermal transfer printing apparatus further comprises a gradation control circuit. In this gradation control circuit, a memory means memorizes image data representing gradation numbers corresponding to images to be printed. A comparing means compares image data of respective gradation levels generated from the memory means with a gradation number produced from a gradation number generating means. A heat time setting means sets a heat time in accordance with each gradation. And, a pulse generating means supplies a pulse signal to the heater element of the thermal head to increase the temperature of the heater element based on an output of the comparing means and an output of the heat time setting means. Thus, a melt or fusion area of ink is controlled by the gradation control circuit so that an extremely high-resolution, high-quality multi-gradational image can be obtained without using a special thermal head.

Moreover, it is preferable that above melt-type thermal transfer printing apparatus further comprises a pressing means for pressing the thermal head by a predetermined pressure. With this arrangement, ink can easily enter or permeate into each pore of the porous layer. Thus, a stable, high-resolution, high-quality, multi-gradational image can be obtained.

Still further, a second aspect of the present invention provides a melt-type thermal transfer printing sheet comprising a base material, and a plurality of porous layers formed on this base material, each maximum porous layer having a pore size in a range to about 25 μm. This arrangement makes it possible to realize a high-density multi-gradational image.

By accumulating a plurality of porous layers having a relatively larger pore diameter, the present invention makes it possible to realize a multi-gradational printing image of high density comparable with the conventional image realized by using a porous layer having a smaller pore diameter. This arrangement is advantageous in that a manufacturing cost for a recording medium can be reduced, since a paper having a large pore diameter can be used as the recording medium. Accordingly, a plain paper can be used as a base material.

Yet further, a third aspect of the present invention provides a melt-type thermal transfer printing apparatus using an ink ribbon brought into contact with a recording medium both of which are pressed by a thermal head under a control of an electric power supplied to the thermal head so that a melt or fusion area of ink can be varied to realize a multi-gradational image on the recording medium. The recording medium is a porous surfaced medium including a single or multilayered porous layer accumulated on a base material. The porous layer contains numerous pores at least 80% of which are smaller pores having a maximum pore diameter in a range to about 10 μm and the remainder are larger pores having diameters in a range of 10 μm to 25 μm. The ink ribbon is coated with a hot melt or heat fusible ink, preferably, by a density equal to or less than 2.5 $g/m^2$.

By arranging the porous layer into a single or multilayered structure having a relatively larger pore diameter, the present invention makes it possible to realize a multi-gradational printing image of high density comparable with the conventionally image realized by using a porous layer having a smaller pore diameter. This arrangement is advantageous in that a manufacturing cost for a recording medium can be reduced compared with that in the prior art, since a paper having a large pore diameter can be used as the recording medium.

Still further, a fourth aspect of the present invention provides a melt-type thermal transfer printing sheet comprising a base material, and a porous layer formed on the base material. The porous layer contains numerous pores, at least 80% percentage of which are smaller pores having a maximum pore diameter in a range to about 10 μm and the remainder are larger pores having diameters in a range of 10 μm to 25 μm. Thus, it becomes possible to obtain a high-quality multi-gradational image. And, the productivity can be improved.

Moreover, a fifth aspect of the present invention provides a melt-type thermal transfer printing sheet comprising a base material, and a multilayered porous layer formed on the base material. The porous layer contains numerous pores, at least 80% percentage of which are smaller pores having a pore diameter in a range to about 10 μm and the remainder being larger pores having a pore diameter in a range of 10 μm to 25 μm. Thus, it becomes possible to obtain a high-quality multi-gradational image. And, the productivity can be improved.

As this invention may be embodied in several forms without departing from the spirit of essential characteristics thereof, the present embodiments as described are therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. A melt-type thermal transfer printing system comprising:

an ink ribbon including a thin film coated with a hot melt or heat fusible ink by a density not exceeding 2.5 $g/m^2$, a porous surfaced recording medium including multilayered porous layers formed on a base material chiefly made of a synthetic paper or pulp, each of said multilayered porous layers containing pores having a pore diameter in a range from about 1 μm, at least 80% of which are smaller pores having a pore diameter in a range from about 1 μm to about 10 μm and the remainder of which are larger pores having a pore diameter in a range from about 10 μm to about 25 μm, a thermal head having a plurality of heater elements arranged in line, each heater element having a width larger than about 25 μm, pressing means for causing said thermal head to apply a predetermined pressure on said thin film of said ink ribbon, thereby forcibly bringing said ink of said ink ribbon into contact with said pores contained in said multilayered porous layers of said recording medium, and gradation control means for controlling an electric power supplied to said thermal head to vary a fusion or fusible region of said ink of said ink ribbon, thereby realizing a multi-gradational image on said recording medium.

2. The melt-type thermal transfer printing system in accordance with claim 1, wherein said gradation control means is a gradation control circuit comprising:

memory means for storing image data representing gradation numbers corresponding to images to be printed;

comparing means for comparing image data of respective gradation levels generated from said memory means with a gradation number of each gradation;

heat time setting means for setting a heat time in accordance with each gradation; and pulse generating means for supplying a pulse signal to said heater elements of said thermal head to increase the temperature of said heater elements based on an output of said comparing means and an output of said heat time setting means.

3. A printing sheet for a melt-type thermal transfer printing system comprising:

a base material chiefly made of a synthetic paper or pulp; and multilayered porous layers formed on said base material, each of said multilayered porous layers containing pores having a pore diameter in a range from about 1 μm to about 25 μm, at least 80% of which are smaller pores having a pore diameter in a range from about 1 μm to about 10 μm and the remainder of which are larger pores having a pore diameter in a range from about 10 μm to about 25 1μm.

4. A printing sheet for a melt-type thermal transfer printing system, said melt-type thermal transfer printing system comprising:

an ink ribbon including a thin film coated with a hot melt or heat fusible ink by a density not exceeding 2.5 $g/m^2$;

a porous surfaced recording medium including multilayered porous layers formed on a base material chiefly made of a synthetic paper or pulp, each of said multilayered porous layers containing pores having a pore diameter in a range from about 1 μm to about 25 μm, at least 80% of which are smaller pores having a pore diameter in a range from about 1 μm to about 10 μm and the remainder of which are larger pores having a pore diameter in a range from about 10 μm to about 25 μm;

a thermal head having a plurality of heater elements arranged in line, each heater element having a width larger than about 25 μm;

pressing means for causing said thermal head to apply a predetermined pressure on said thin film of said ink ribbon, thereby forcibly bringing said ink of said ink ribbon contact with said pores contained in said multilayered porous layers of said recording medium; and gradation control means for controlling an electric power supplied to said thermal head to vary a fusion or fusible region of said ink of said ink ribbon, thereby realizing a multi-gradational image on said recording medium, and said printing sheet comprising:

a base material chiefly made of a synthetic paper or pulp; and multilayered porous layers formed on said base material, each of said multilayered porous layers containing pores having a pore diameter in a range from about 1 μm to about 25 μm, at least 80% of which are smaller pores having a pore diameter in a range from about 1 μm to about 10 μm and the remainder of which are larger pores having a pore diameter in a range from about 10 μm to about 25 μm.

* * * * *